Figure 1:
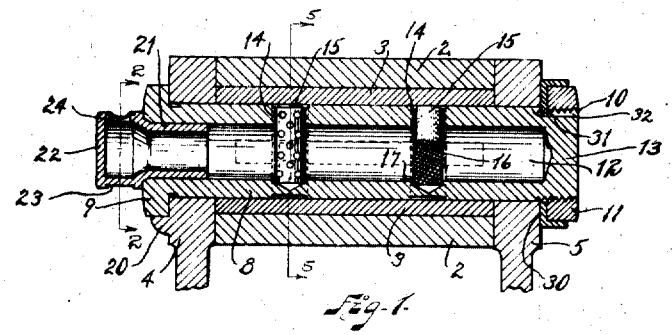

O. ZERK.
SELF LUBRICATING BOLT.
APPLICATION FILED MAY 27, 1913.

1,217,259.

Patented Feb. 27, 1917.

Witnesses:
Oliver M. Kappler
Justin W. Macklin

Inventor
Oscar Zerk,
By Albert H. Baker,
Attorney

UNITED STATES PATENT OFFICE.

OSCAR ZERK, OF CLEVELAND, OHIO, ASSIGNOR, BY MESNE ASSIGNMENTS, TO GEORGE W. BOWEN, OF AUBURN, NEW YORK.

SELF-LUBRICATING BOLT.

1,217,259. Specification of Letters Patent. Patented Feb. 27, 1917.

Application filed May 27, 1913. Serial No. 770,160.

*To all whom it may concern:*

Be it known that I, OSCAR ZERK, a subject of the Emperor of Austria-Hungary, residing at Cleveland, in the county of Cuyahoga and State of Ohio, have invented a certain new and useful Improvement in Self-Lubricating Bolts, of which the following is a full, clear, and exact description, reference being had to the accompanying drawings.

This invention relates to self-lubricating bolts of a type adapted to be used on leaf springs of automobiles. Its general object is to provide strong simple bolts which shall feed the oil to the bearing surface as needed, and which shall be easily accessible for refilling and at the same time have a very neat appearance. A more specific object is to so construct the parts that they may be cheaply manufactured. Another object is to provide an efficient device for supporting the wick which feeds the oil to the bearing surfaces. These, and other objects will become apparent in the description of the embodiment shown in the drawing hereof.

Figure 2:
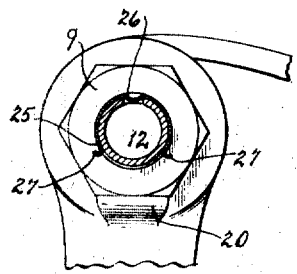
Figure 4:
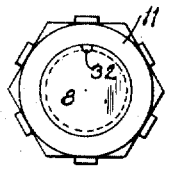
Figure 3:
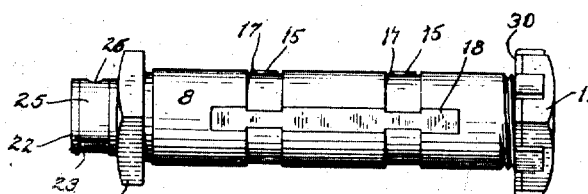
Figure 5:
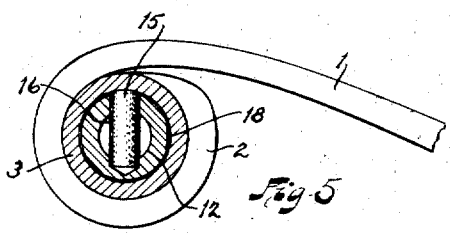

In the drawing, Figure 1 is a vertical axial section through my spring bolt, in place in the eye of a spring between two shackle ears or plates. Fig. 2 is a sectional view taken on the line 2—2 of Fig. 1. Fig. 3 is the side elevation of the spring bolt removed. Fig. 4 is a right hand end elevation of the bolt and nut. Fig. 5 is the transverse section taken on the line 5—5 of Fig. 1.

Referring to the parts by numerals, 1 indicates the leaf of an automobile spring, and 2 the curled end thereof making an eye for receiving the bolt. In this eye is snugly fitted a bearing sleeve 3, between two shackle plates 4 and 5. These two shackle plates may be the two arms of a single shackle, or may be ears of another spring member, as is well understood.

8 indicates the bolt which occupies the alined openings in the two shackle members and the intermediate sleeve 3. At one end of the bolt is an angular or hexagon head 9 integral therewith, while the other end is threaded at 10 to receive the nut 11, which is shown as a hexagon nut. This construction pivotally connects the leaf spring 1 with the shackle members, as will be well understood. The bolt 8 is of comparatively large diameter to provide a large bearing surface and has an internal bore 12 extending from the end of the head 9, to the wall 13, in the threaded end.

Extending through the wall of the bolt are one or more radial holes 14. Occupying these holes and extending across the bore 12 are wicks or porous plugs 15, preferably of felt, although any suitable porous material may be used. These wicks are contained in perforated tubes, 16 occupying the radial holes 14, extending across the bore and having their inner ends seating in suitable depressions 17 registering with the holes 14. These tubes may be perforated, as shown in Fig. 1, or if desired may be made of wire net.

The outer ends of the wicks 15 press against the bearing sleeve 3 and serve to carry the oil thereto as needed by capillary attraction. To properly distribute the oil shallow peripheral grooves 17 are provided around the bore, in communication with the radial holes 14. A shallow longitudinal groove 18 extends well toward each end of the bolt and is in communication with these peripheral grooves. This serves to distribute the oil throughout the length of the sleeve 3 without carrying it to the other portions of the structure, which it is not necessary to lubricate.

To keep these radial holes at the top so that the oil will not leak out I provide on the shackle plate 4 a suitable boss 20 engaging one of the flat sides of the head 9 to prevent the bolt turning.

In the open end of the bore 12 is fitted a shank or reduced end portion 21 of an oil cup or hollow plug 22. The shank 21 is somewhat smaller in diameter than the cup portion, and forms a shoulder which abuts the head 9 of the bolt. Around the head 22 is formed a shallow peripheral groove 23. A suitable opening 24 is made through the cylindrical wall of the head 22 and in the groove 23 through which the oil cup and bore 12 may be filled with the oil. In this groove 23 is a thin spring 25 which extends around the head somewhat more than one-half of the circumference. In a portion of the spring is a small depression 26, which engages the oil hole 24 and prevents the spring from moving around the head. The hugging action of the spring 25 keeps the spring in position in the groove and prevents the depression 26 moving inadvertently out of engagement with the oil hole 24. The ends of the spring 25 are bent outwardly as at 27, thus forming projections by which the spring may be slid around the groove by hand when it is desired to fill the oil reservoir. This construction provides a very simple dust proof cover for the oil hole.

The construction of the oil cup is such that it may be pressed from a single piece of sheet metal into the shape shown, and then forced into position in the bore from which it is not necessary to remove it throughout the life of the bolt.

I provide simple locking means for the nut 11, which consists of a washer 30 surrounding the threaded portion 10 of the bore, and having the small projection 31 engaging a longitudinal groove 32 in the bolt. This washer has preferably an angular or hexagonal exterior, substantially the same size as the nut 10, and from the middle portion of each edge extend ears 33. These ears lie idly in the plane of the washer, while the parts are being assembled, but when in use are bent over onto the flat sides of the nut to hold it against rotation.

It will be seen from the foregoing description that I have provided a strong and simple self-lubricating spring bolt, which, when in use, requires practically no attention, for the lubricant is only taken from the reservoir as needed, and will last a very long time. Its bearing surfaces are large and the oil is distributed to the points needed, but not beyond them. The neatness of appearance is also a feature of the bolt, there being only a very small compact head on the oil cup from which the bore is filled.

Having thus described my invention, what I claim is:

1. A self-lubricating bolt comprising a one piece body portion having a lengthwise passage opening through one end of the bolt and a lateral passage leading from the lengthwise passage through the periphery of the body, and a hollow plug extending into the lengthwise passage at its open end, and having a filling opening, substantially as and for the purpose set forth.

2. A self-lubricating bolt comprising a one piece body portion having an opening through the head of the bolt, a hollow plug occupying said opening and having a filling opening exterior to the bolt body, and a closure for the filling opening carried by said hollow plug on the periphery thereof.

3. In a device of the character described, the combination of a bolt body having a bore extending into one end, a hollow plug having a reduced portion snugly occupying the bore, a head portion beyond the head of the bolt, an annular groove in said head portion, a filling opening through it, and a closing spring occupying the groove and adapted to cover the opening.

4. In a self-lubricating bolt, the combination of a body having a head at one end and having a central bore extending through such head, a hollow plug snugly occupying the bore adjacent to the head and bearing against the outer edge of the head, a filling opening into said plug exterior to the head, a closure for said opening, a lateral opening from the bore to the bearing surface of the bolt, a tube in said lateral opening extending crosswise of the bore and having passageways through it, and a fibrous material within the tube.

5. In the self-lubricating bolt, the combination of a body having a head at one end, and a central bore extending through the head, a hollow plug fitting in the bore and abutting against the end of the head and having a filling opening extending through the periphery thereof and a closure for said opening.

In testimony whereof, I hereunto affix my signature in the presence of two witnesses.

OSCAR ZERK.

Witnesses:
BRENNAN B. WEST,
GERTRUDE K. SMITH.